United States Patent
Ji et al.

(10) Patent No.: US 7,610,630 B2
(45) Date of Patent: Oct. 27, 2009

(54) METHOD OF TRANSFERRING INFORMATION SPECIFYING A TOOL UTILIZED FOR PROCESSING A CONTENT PROTECTED BY IPMP

(75) Inventors: Ming Ji, Singapore (SG); Zhongyang Huang, Singapore (SG); Sheng Mei Shen, Singapore (SG); Takanori Senoh, Hirakata (JP)

(73) Assignee: Panasonic Corporation, Osaka (JP)

( * ) Notice: Subject to any disclaimer, the term of this patent is extended or adjusted under 35 U.S.C. 154(b) by 704 days.

(21) Appl. No.: 10/493,219

(22) PCT Filed: Mar. 4, 2003

(86) PCT No.: PCT/JP03/02463

§ 371 (c)(1),
(2), (4) Date: May 6, 2004

(87) PCT Pub. No.: WO03/075576

PCT Pub. Date: Dec. 9, 2003

(65) Prior Publication Data

US 2005/0015707 A1    Jan. 20, 2005

Related U.S. Application Data

(60) Provisional application No. 60/361,331, filed on Mar. 5, 2002.

(51) Int. Cl.
*G06F 7/04* (2006.01)
*G06F 17/30* (2006.01)
*G06K 9/00* (2006.01)

(52) U.S. Cl. .......................................... 726/29; 713/194

(58) Field of Classification Search ................. 713/194; 726/29
See application file for complete search history.

(56) References Cited

U.S. PATENT DOCUMENTS

| | | | |
|---|---|---|---|
| 5,505,449 A * | 4/1996 | Eberhardt et al. | 463/29 |
| 5,913,027 A | 6/1999 | Matsuda et al. | |
| 6,885,999 B1 * | 4/2005 | Corless | 705/59 |
| 6,959,289 B1 * | 10/2005 | James et al. | 705/51 |
| 7,099,491 B2 * | 8/2006 | Takaku | 382/100 |

(Continued)

OTHER PUBLICATIONS

B.J. Van Rijnsoever et al., "Interoperable Content Protection for Digital TV," IEEE International Conference on New York, Jul. 30, 2000, pp. 1407-1410.

(Continued)

*Primary Examiner*—David Garcia Cervetti
(74) *Attorney, Agent, or Firm*—Greenblum & Bernstein PLC

(57) ABSTRACT

A method of transferring information specifying an IPMP tool utilized for processing a content protected by IPMP to an IPMP terminal specifies and uses XML schema for terminal platform specification, parametric description, and parametric aggregation which is to be used in MPEG-n IPMP system. For example, according to the method, based on a predetermined terminal platform XML schema and language to describe a terminal platform, terminal platform specification is created based on the terminal platform schema and language to specify on what platform or terminal the IPMP tool can run. The terminal platform specification is attached to metadata associated with the tool. The terminal platform specification and the IPMP tool are transferred to an IPMP terminal which is implemented with a terminal platform parser based on the terminal platform schema and language.

3 Claims, 7 Drawing Sheets

U.S. PATENT DOCUMENTS

| | | | |
|---|---|---|---|
| 7,185,049 B1 * | 2/2007 | Benitez et al. | 709/203 |
| 7,210,039 B2 * | 4/2007 | Rodgers et al. | 713/182 |
| 7,433,471 B2 * | 10/2008 | Shen et al. | 380/201 |
| 7,436,958 B2 * | 10/2008 | Ji et al. | 380/200 |
| 7,467,297 B2 * | 12/2008 | Ji et al. | 713/164 |
| 2002/0007357 A1 | 1/2002 | Wong et al. | |
| 2002/0077985 A1 * | 6/2002 | Kobata et al. | 705/51 |
| 2002/0077986 A1 * | 6/2002 | Kobata et al. | 705/52 |
| 2002/0156712 A1 * | 10/2002 | Rambhia | 705/36 |
| 2003/0149890 A1 * | 8/2003 | Shen et al. | 713/200 |
| 2004/0054892 A1 * | 3/2004 | Ji et al. | 713/164 |
| 2004/0059929 A1 * | 3/2004 | Rodgers et al. | 713/193 |
| 2004/0093337 A1 * | 5/2004 | Shen et al. | 707/100 |
| 2004/0139023 A1 * | 7/2004 | Huang et al. | 705/51 |
| 2004/0236956 A1 * | 11/2004 | Shen et al. | 713/193 |
| 2005/0015707 A1 * | 1/2005 | Ji et al. | 715/500 |
| 2005/0022227 A1 * | 1/2005 | Shen et al. | 725/28 |
| 2005/0075998 A1 * | 4/2005 | Huang et al. | 707/1 |
| 2005/0165714 A1 * | 7/2005 | Ji et al. | 707/1 |
| 2005/0204067 A1 * | 9/2005 | Ji et al. | 709/250 |
| 2005/0271205 A1 * | 12/2005 | Shen et al. | 380/201 |
| 2006/0167876 A1 * | 7/2006 | Benitez et al. | 707/7 |
| 2007/0006276 A1 * | 1/2007 | Ashley et al. | 725/134 |
| 2007/0008568 A1 * | 1/2007 | Senoh | 358/1.14 |
| 2007/0028235 A1 * | 2/2007 | Liu et al. | 717/177 |
| 2007/0112679 A1 * | 5/2007 | Kwon | 705/51 |
| 2007/0130076 A1 * | 6/2007 | Park et al. | 705/57 |

OTHER PUBLICATIONS

R. Koenen, "Intellectual Property Management and Protection in MPEG Standards," downloaded from http://mpeg.telecomitalialab.com/standards/ipmp/ on Jan. 2001.

J.H. Kim et al., "MPEG-21 IPMP," International Conference on Information Technology and Applications, Sep. 14, 2002, pp. 1-7.

Rambhia, Avni: ISO/IEC JTC1/SC29/WG11 N4269 Jul. 2001, "Text of CD ISO/IEC 21000-4:2001" published on Jul. 23, 2001.

* cited by examiner

METHOD OF TRANSFERRING INFORMATION SPECIFYING A TOOL UTILIZED FOR PROCESSING A CONTENT PROTECTED BY IPMP

CROSS-REFERENCES TO RELATED APPLICATIONS

This application is a National Stage of PCT/JP03/02463, filed on Mar. 3, 2003, which claims the benefit of U.S. Provisional Application No. 60/361,331, filed on Mar. 5, 2002.

TECHNICAL FIELD

The present invention relates to content distribution and protection, especially to such applications where the protected content based on MPEG-n is consumed by different IPMP (intellectual Property Management and Protection) terminals, and the same content is protected by different IPMP tools.

BACKGROUND ART

Content distribution is becoming more and more demanding as multimedia data and contents can reach anywhere and anytime. Users are happy with the convenience and flexibility, and they can enjoy entertainment easily and efficiently. On the other hand, content owners are worried about the illegal usage of their property. There is a balance between two sides.

There are a lot of protection techniques for protecting the content, such as data encryption, watermarking, etc. They have been implemented in many content distribution applications. It seems different system employs different kinds of mechanisms and protection techniques to distribute content with protection. All the terminals or content consuming devices in that case are only able to play and consume the content that is provided by the same content provider. They cannot exchange their terminal or device to playback different contents.

In MPEG-n context, a standardisation group has been working on MPEG-2,4,7,21 IPMP (Intellectual Property Management and Protection).

FIG. 7 shows the prior art for the current typical IPMP architecture. In FIG. 7, it is assumed that content in module 1.1 coming into IPMP system is an MPEG-21 protected multimedia In fact, under MPEG-21 "big picture", the coming content is called Digital Item in MPEG-21 framework. Three units 1.2, 1.3, 1.4 in module 1.1 illustrate IPMP information transferred in content for IPMP system processing. The IPMP Tool List unit 1.2 identifies, and enables selection of the IPMP Tools required to process the content. The IPMP Tool Elementary Stream unit 1.3 identifies the actual tools carried in the content itself. IPMP Information unit 1.4 identifies the information directed to a given IPMP Tool to enable, assist or facilitate its operation.

As for the right part of FIG 7, it shows an IPMP terminal (module 1.5, a device that consumes possibly protected incoming content in compliance with the usage rules) including IPMP Tool Manager (module 1.6, processes IPMP Tool List(s) unit 1.2 and retrieves the IPMP Tools module 1.8, 1.9, 1.10, 1.11 that are specified therein) and Message Router (module 1.7, implements the Terminal-side behavior of the Terminal-Tool interface). The module 1.8 of Missing IPMP Tools (not available in module 1.5) and the module 1.9, 1.10, 1.11 of IPMP Tool (available in module 1.5) denote the tool that perform (one or more) IPMP functions such as authentication, decryption, watermarking, etc.

Such a solution is able to achieve both of the following:
1. Allow the same protected content to be consumed on different vendors' MPEG-n IPMP Terminals. This will be fully enabled.
2. Allow the same content to be protected by different vendors' IPMP Tools. This will be assisted to as large extent as possible.

To achieve such a wide interoperability, IPMP provides download ability of tools, where tools can be retrieved remotely. IPMP also allows the terminal to choose its own favourite tool according to parametric description. An IPMP terminal can also aggregate several tools together to form a tool set (act as just one tool) according to some parametric aggregation.

An IPMP tool may also optionally carry a tool meta data that specifies information about this tool, for example, whether this tool can run on a particular operating system.

In order to achieve a flexible and interoperable IPMP system structure for MPEG-n and other applications as described above, we should be able to allow the followings.
1. When an IPMP terminal goes to a remote site trying to retrieve a missing IPMP tool in order to playback a certain content, the IPMP terminal should provide the remote site terminal platform specification, so that the remote site can send a tool that can run on this particular IPMP terminal.
2. An IPMP Tool's metadata may optionally include the terminal platform specification that specifies what are the terminals and platforms that the tool can run on.
3. A parametric description to allow terminal to choose a certain IPMP tool that can facilitate the job it is supposed to do.
4. A parametric aggregation to allow several tools to form as one tool set, and appeared as just one tool to the IPMP terminal.

DISCLOSURE OF INVENTION

To solve the problem, to assure a clear and interoperable standard, and to provide future extensibility, XML schema should be defined for terminal platform specification, parametric description as well as parametric aggregation.

The XML schema for terminal platform specification should allow specification of CPU, memory, Operating system, virtual machine, etc, so that the remote site can have a full knowledge of the terminal and choose an appropriate tool for the terminal.

When the tool metadata contains the terminal platform XML language, the terminal can also decide whether this tool can run on it according to the XML language.

The parametric description is defined to allow a generic description of any types of IPMP tool, whether it is a decryption tool or a watermarking tool or a rights management tool. Based on the parametric description, an IPMP terminal is then able to choose its own favourite tool.

The parametric aggregation is defined to allow the terminal (or master tool) to combine a set of tools, connection points, i/o, etc can all be defined in the parametric aggregation so that the terminal (or master tool) can have a full knowledge of what to do.

Based on the terminal platform XML schema, an IPMP terminal can describe what it is, what the CPU is, what the operating system is, whether there are any assistant hardwares, etc. The IPMP terminal can then send the information to the remote site while trying to retrieve a missing IPMP tool.

The remote site, after receiving the information, and XML schema parsing, can then decide which tool (a windows DLL or a Java Byte Code, for example) to send.

Based on the terminal platform XML schema, an IPMP tool can also describe on what platform it can run, and carry the information in the metadata associated with the IPMP tool. When receiving such an IPMP tool, an IPMP terminal can decide whether this tool can surely run on it.

Based on the parametric description XML schema, the content provider can now describe what type of tool is required to playback the content, instead of using fixed tool IDs. For example, the content provider can specify that an AES tool, with block size of 128 bits is required to decrypt video stream. The IPMP terminal, upon receiving such XML language specifying this tool, can then choose an optimised AES tool from the embedded tools.

Based on the parametric aggregation XML schema, the content provider can describe what are the tools need to be combined as one tool to process the content. The XML language can specify things like tool IDs, tool i/o, etc. So that the terminal can use the information to build such a tool set.

BEST MODE FOR CARRYING OUT THE INVENTION

The IPMP system has been designed to provide a framework and specifications for better interoperability in standard bodies, especially in MPEG-n (n=2, 4, 7, 21). It allows the same protected content to be consumed on different vendors' terminals; it also allows the same content to be protected by different vendors' IPMP Tools.

1. First Embodiment

Figure 1:
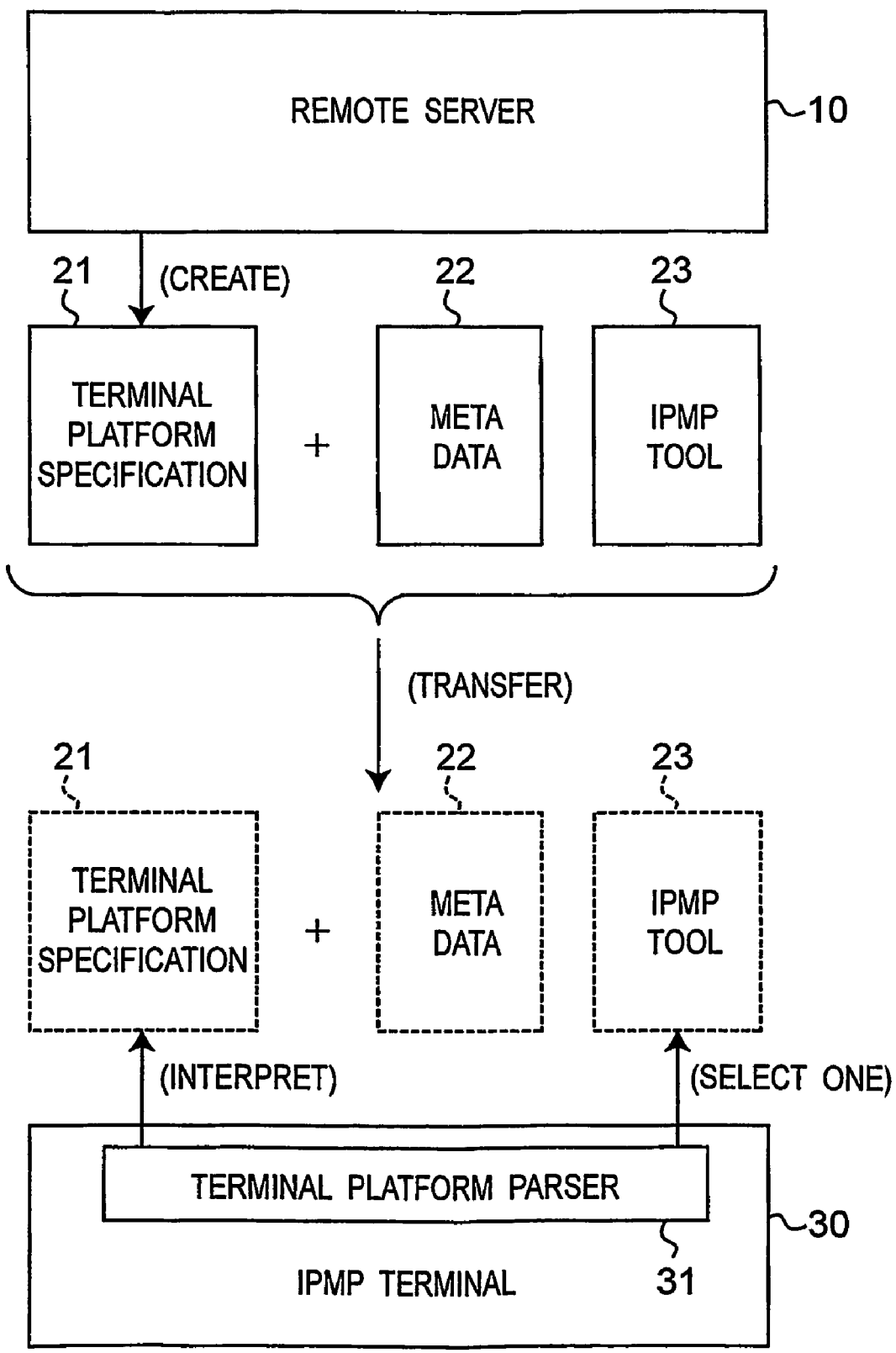
FIG. 1 is a view explaining the method in the fist embodiment of the present invention.

With reference to FIG. 1, description is made below to one embodiment of a method of transferring information specifying a tool utilized for processing a content protected by IPMP from a server to an IPMP terminal. The method uses XML schema for terminal platform specification in MPEG-n IPMP system.

A flexible terminal platform schema and language are specified and defined to describe a terminal platform specification in advance. That is, the terminal platform schema and language are standardised to make them known to public. The terminal platform specification includes information describing, in XML schema, terminal functions, terminal performance and so on required for decrypting the content to which the specification is attached, and is described later.

A remote server 10 creates terminal platform specification 21 based on the predetermined terminal platform schema and language to specify on what platform or terminal the IPMP tool can run.

The created terminal platform specification 21 is attached to metadata 22 associated with the tool 23. The tool 23 together with the terminal platform specification 21 attached to the metadata 22 may be carried in an IPMP protected content.

The server 10 transfers the metadata 22 with the terminal platform specification 21 and the IPMP tool 23 to an IPMP terminal 30 which is implemented with a terminal platform parser 31 based on the terminal platform schema and language. The terminal platform parser 31 can interpret and execute the terminal platform specification 21 according to syntax of given XML schema.

After receiving the metadata 22 with the terminal platform specification 21, the IPMP terminal 30 extracts the terminal platform specification 21 from the metadata 22, and interprets the terminal platform specification 21 to determine whether the IPMP tool is the terminal's desired one, by the implemented terminal platform parser 31.

2. Second Embodiment

Figure 2:
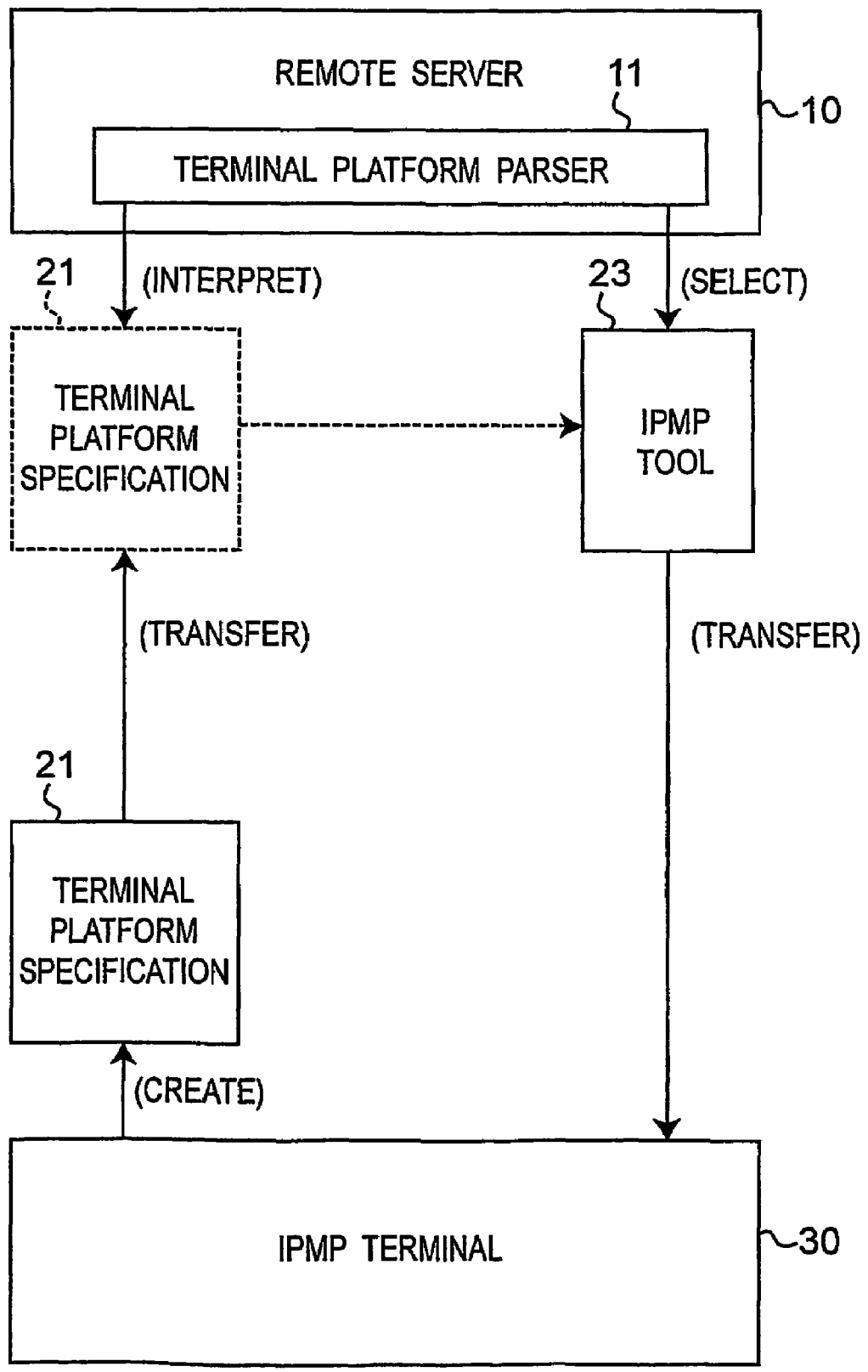
FIG. 2 is a view explaining the method in the second embodiment of the present invention.

With reference to FIG. 2, description is made below to another embodiment of a method of transferring information specifying a tool utilized for processing a content protected by IPMP from a server to an IPMP terminal. The method uses XML schema for terminal platform specification in MPEG-n IPMP system.

An IPMP terminal 30 creates terminal platform specification 21 based on the predetermined terminal platform schema and language to specify itself. The IPMP terminal 30 then transfers the terminal platform specification 21 to a remote server 10 when the IPMP terminal 30 tries to retrieve an IPMP tool 23 from the remote server 10 which is implemented with a terminal platform parser 11 based on the terminal platform schema and language.

The server 10 receives the terminal platform specification 21 from the terminal 30, interprets the terminal platform specification 21, determines which IPMP tool should be sent back to the requesting IPMP terminal 30, and then sends the determined IPMP tool 23 to the requesting IPMP terminal 30. The terminal 30 receives the IPMP tool 23 and uses it to decrypt the content.

3. Third Embodiment

Figure 3:
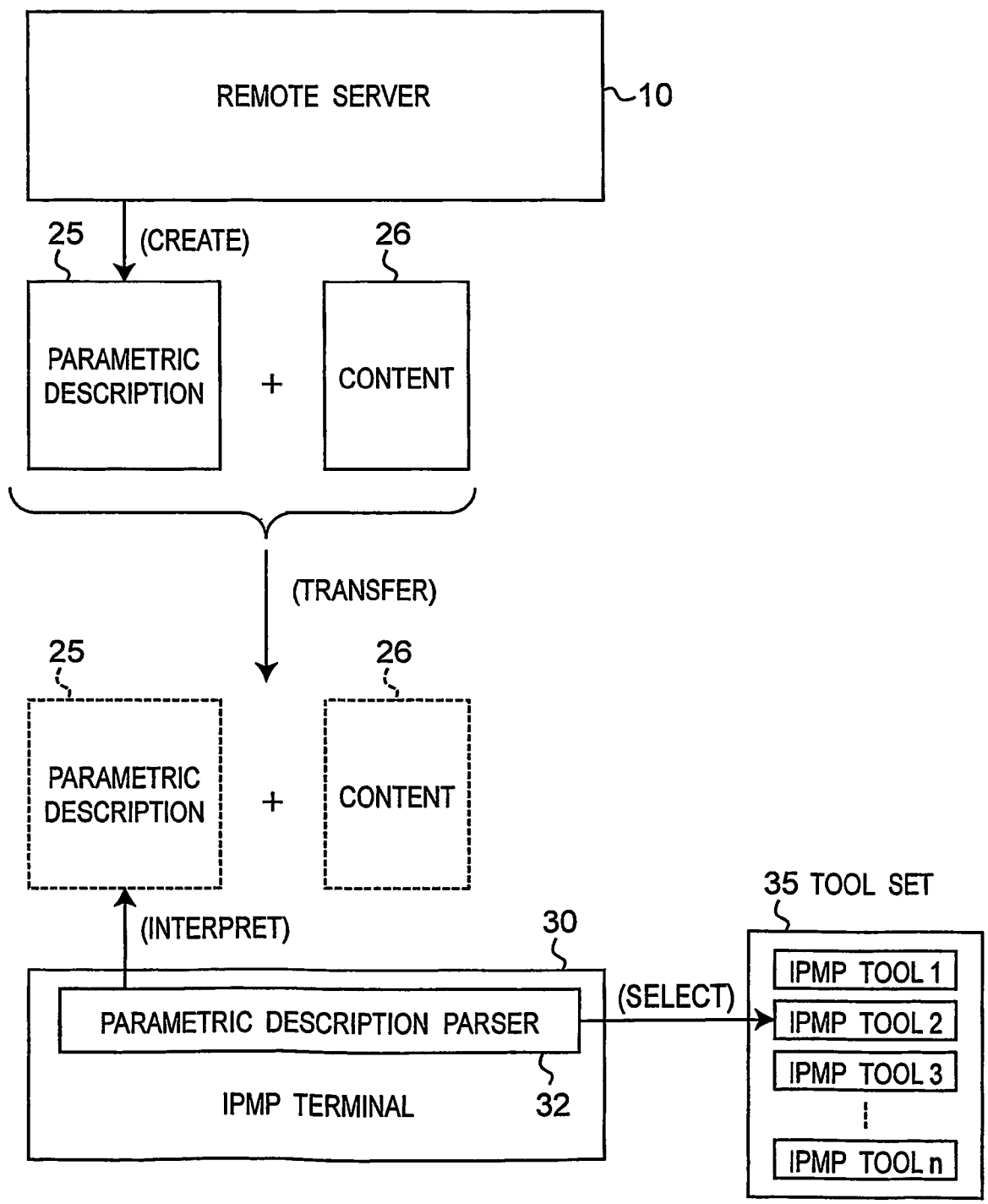
FIG. 3 is a view explaining the method in the third embodiment of the present invention.

With reference to FIG. 3, description is made to still another embodiment of a method according to the invention. The method uses XML schema for parametric description in MPEG-n IPMP system. The parametric description is information describing, in XML schema, terminal functions, terminal performance and so on required for decrypting the content to which the specification is attached.

A flexible parametric description schema and language are specified and defined to describe an IPMP tool in advance. That is, the parametric description schema and language are standardised to make known to public.

A remote server 10 creates a parametric description 25 based on the predetermined parametric description schema and language to specify a desired IPMP tool, attaches the parametric description 25 to a content 26 that is protected by IPMP, and transfers the parametric description 25 and the content 26 to an IPMP terminal 30 which is implemented with a parametric description parser 32 based on the parametric description schema and language. The parametric description parser 32 can interpret and execute the parametric description according to syntax of given XML schema.

The terminal 30 extracts the parametric description 25 from the content 26, interprets the parametric description 25, and selects an IPMP tool from the terminal's tool set 35 that satisfy the parametric description, by the parametric description parser 32.

More specifically, when receiving the content, the parametric description parser 32 extracts the parametric description 25 from the received content 26, and routes the extracted parametric description 25 to each IPMP tool within its tool set 35 to ask whether the tool satisfy the parametric description 25. The parametric description parser 32 compares each IPMP tool within the terminal's tool set 35 with the parametric description 25 and verifies whether the IPMP tool can satisfy the parametric description 25. The result is made known to the IPMP terminal 30. The IPMP terminal 30 can then choose a tool from the tool set that satisfy the parametric description 25.

4. Fourth Embodiment

Figure 4:
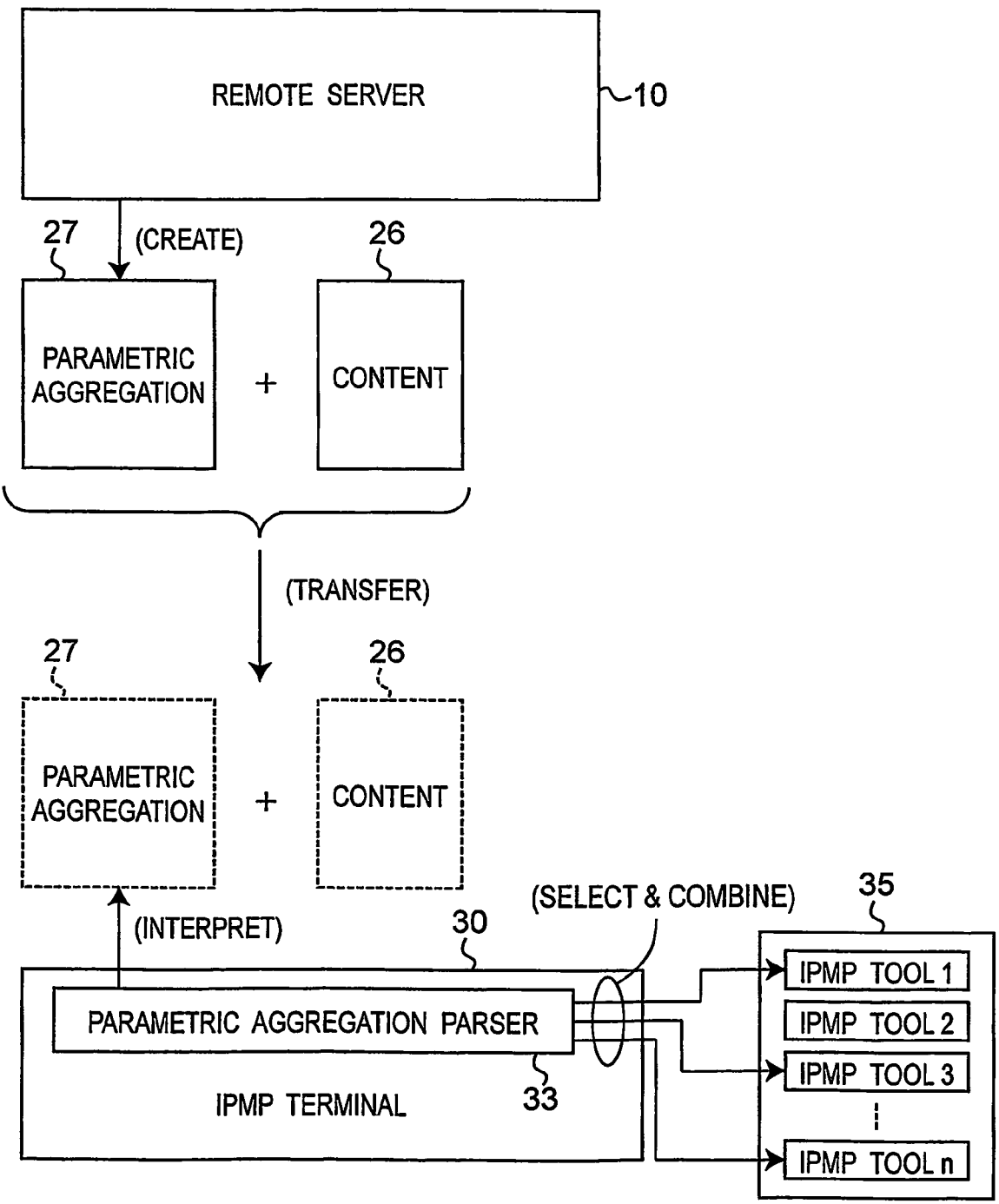
FIG. 4 is a view explaining the method in the fourth embodiment of the present invention.

With reference to FIG. 4, description is made below to still another embodiment of a method according to the invention. The method uses XML schema for parametric aggregation in MPEG-n IPMP system. The parametric aggregation is described later with reference to FIG. 6.

A flexible parametric aggregation schema and language are specified and defined to describe a combination of IPMP tools in advance. That is, the parametric aggregation schema and language are standardised to make known to public.

A remote server 10 creates a parametric aggregation 27 based on the predetermined parametric aggregation schema and language to specify a desired combination of IPMP tools, and attaches the parametric aggregation 27 to a content 26 that is protected by IPMP. The server 10 transfers the parametric aggregation 27 and the content 26 to an IPMP terminal 30 which is implemented with a parametric aggregation parser 33 based on the parametric aggregation schema and language.

The IPMP terminal 30 extracts the parametric aggregation 27 from the content 26, interprets the parametric aggregation 27, and combines the specified IPMP tools from the terminal's tool set that satisfy the parametric aggregation 27, by the parametric aggregation parser 33.

5. Terminal Platform XML Schema

Figure 5:
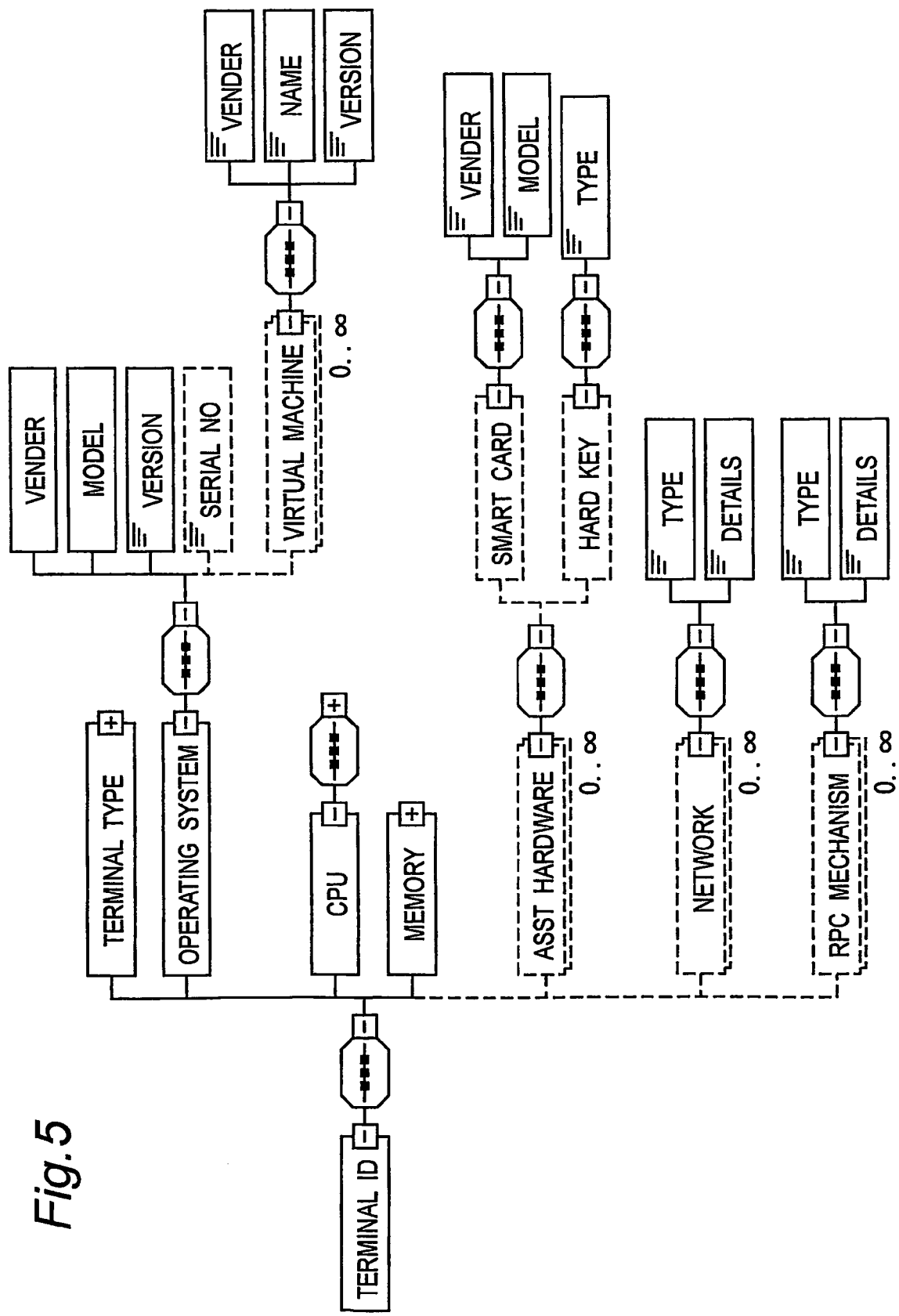
FIG. 5 shows the architecture of Terminal Platform XML Schema.

FIG. 5 illustrates the architecture of the terminal platform in which a terminal ID is described in the following XML schema.

```
<?xml version="1.0" encoding="UTF-8"?>
<xsd:schema xmlns:xsd="http://www.w3.org/2001/XMLSchema" elementFormDefault="qualified">
    <xsd:element name="TerminalID">
        <xsd:annotation>
            <xsd:documentation>Identification of a terminal</xsd:documentation>
        </xsd:annotation>
        <xsd:complexType>
            <xsd:sequence>
        <xsd:element name="TerminalType">
            <xsd:complexType>
                <xsd:sequence>
                    <xsd:element name="Vendor" type="xsd:string"/>
                    <xsd:element name="Model" type="xsd:string"/>
                    <xsd:element name="SerialNO" type="xsd:string" minOccurs="0"/>
                </xsd:sequence>
            </xsd:complexType>
        </xsd:element>
        <xsd:element name="OperatingSystem">
            <xsd:complexType>
                <xsd:sequence>
                    <xsd:element name="Vendor" type="xsd:string"/>
                    <xsd:element name="Model" type="xsd:string"/>
                    <xsd:element name="Version" type="xsd:string"/>
                    <xsd:element name="SerialNO" type="xsd:string" minOccurs="0"/>
                    <xsd:element name="VirtualMachine" minOccurs="0" maxOccurs="unbounded">
                        <xsd:complexType>
                            <xsd:sequence>
                                <xsd:element name="Vendor" type="xsd:string"/>
                                <xsd:element name="Name" type="xsd:string"/>
                                <xsd:element name="Version" type="xsd:string"/>
                            </xsd:sequence>
                        </xsd:complexType>
                    </xsd:element>
                </xsd:sequence>
            </xsd:complexType>
        </xsd:element>
        <xsd:element name="CPU">
            <xsd:complexType>
                <xsd:sequence>
                    <xsd:element name="Vendor" type="xsd:string"/>
                    <xsd:element name="Model" type="xsd:string"/>
                    <xsd:element name="Speed" type="xsd:integer"/>
                </xsd:sequence>
            </xsd:complexType>
        </xsd:element>
        <xsd:element name="Memory">
            <xsd:complexType>
                <xsd:sequence>
```

-continued

```
            <xsd:element name="Vendor" type="xsd:string"/>
            <xsd:element name="Model" type="xsd:string"/>
            <xsd:element name="Size" type="xsd:integer"/>
            <xsd:element name="Speed" type="xsd:integer"/>
         </xsd:sequence>
      </xsd:complexType>
   </xsd:element>
   <xsd:element name="AsstHardware" minOccurs="0" maxOccurs="unbounded">
      <xsd:complexType>
         <xsd:sequence>
            <xsd:element name="SmartCard" minOccurs="0">
               <xsd:complexType>
                  <xsd:sequence>
                     <xsd:element name="Vendor" type="xsd:string"/>
                     <xsd:element name="Model" type="xsd:string"/>
                  </xsd:sequence>
               </xsd:complexType>
            </xsd:element>
            <xsd:element name="HardKey" minOccurs="0">
               <xsd:complexType>
                     <xsd:sequence>
                        <xsd:element name="Type" type="xsd:string"/>
                     </xsd:sequence>
                  </xsd:complexType>
               </xsd:element>
            </xsd:sequence>
         </xsd:complexType>
      </xsd:element>
      <xsd:element name="Network" minOccurs="0" maxOccurs="unbounded">
         <xsd:complexType>
            <xsd:sequence>
               <xsd:element name="Type" type="xsd:string"/>
               <xsd:element name="Details" type="xsd:string"/>
            </xsd:sequence>
         </xsd:complexType>
      </xsd:element>
      <xsd:element name="RPCMechanism" minOccurs="0" maxOccurs="unbounded">
         <xsd:complexType>
            <xsd:sequence>
               <xsd:element name="Type" type="xsd:string"/>
               <xsd:element name="Details" type="xsd:string"/>
            </xsd:sequence>
            <xsd:attribute name="Type" type="xsd:string" use="required"/>
         </xsd:complexType>
      </xsd:element>
      </xsd:sequence>
   </xsd:complexType>
</xsd:element>
</xsd:schema>
```

The semantics of the description is as follows.
TerminalType
   Vendor: "Vendor of the specific terminal, for example, a PC's vendor may be DELL"
   Model: "Model name"
   SerialNO: "serial number of this terminal"
OperatingSystem
   Vendor: "Vendor of the specific operating system, for example, windows95's vendor is Microsoft"
   Model: "model name of the operating system"
   Version: "version number of the operating system"
   SerialNO: "serial number of the operating system, if any"
VirtualMachine
   Vendor: "Virtual Machine's vendor, for example, JVM's vendor is SUN"
   Name: "name of the virtual machine, for example, Java Virtual Machine"
   Version: "version number of the virtual machine"
CPU
   Vendor: "Vendor of the CPU, for example, INTEL"
   Model: "Model name of the CPU, for example, Pentium"
   Speed: "Speed of the CPU"
Memory
   Vendor: "Vendor of the memory"
   Model: "Model name of the memory"
   Size: "size of the memory"
   Speed: "speed of the memory"
AsstHardware
   SmartCard
      Vendor: "Vendor of the smartcard"
      Model: "Model Name of the smartcard"
   HardKey
      Type: "type of the hardkey, for example, parallel port hardkey"
   Network
      Type: "type of the network, for example, Ethernet"
      Detail
   RPCMechanism
      Type: "mechanism of the Remote Procedure Call, for example, SOAP, DCOM"
      Details 6. Parametric Description The parametric description of the terminal platform is described in the following XML schema.

```xml
<?xml version="1.0" encoding="UTF-8"?>
<xsd:schema xmlns:xsd="http://www.w3.org/2001/XMLSchema" elementFormDefault="qualified">
    <xsd:element name="PARAMETRIC_DESCRIPTION">
        <xsd:annotation>
            <xsd:documentation>Comment describing your root element</xsd:documentation>
        </xsd:annotation>
        <xsd:complexType>
            <xsd:sequence>
                <xsd:element name="VERSION">
                    <xsd:complexType>
                        <xsd:attribute name="MAJOR_VERSION" type="xsd:string"/>
                        <xsd:attribute name="MINOR_VERSION" type="xsd:string"/>
                    </xsd:complexType>
                </xsd:element>
                <xsd:element name="CLASS" type="xsd:string"/>
                <xsd:element name="SUBCLASS" type="xsd:string"/>
                <xsd:complexType>
                    <xsd:sequence>
                        <xsd:element name="TYPEDATA" maxOccurs="unbounded">
                            <xsd:complexType>
                                <xsd:simpleContent>
                                    <xsd:extension base="xsd:anySimpleType">
                                        <xsd:attribute name="type" type="xsd:anySimpleType"/>
                                    </xsd:extension>
                                </xsd:simpleContent>
                            </xsd:complexType>
                        </xsd:element>
                    </xsd:sequence>
                    <xsd:attribute name="type" type="xsd:string"/>
                </xsd:complexType>
            </xsd:element>
            <xsd:element name="ADDITIONAL_DATA" type="xsd:string" minOccurs="0"/>
        </xsd:sequence>
    </xsd:complexType>
    </xsd:element>
</xsd:schema>
```

The semantics of the above description is as follows.

VERSION

MAJOR_VERSION: "Major version of the parametric description schema"

MINOR_VERSION: "minor version of the parametric description schema" CLASS: "class of the parametrically described tool, for example, decryption" SUBCLASS: "sub-class of the parametrically described tool, for example, AES under decryption class"

TYPEDATA: "specific type data to describe a particular type of tool, for example, Block_length of further specify a AES decryption tool"

type (attribute): "value of the type data above, for example, 128 for the Block_length"

ADDITIONAL_DATA: "Any additional data which may help to further describe the parametrically defined tool"

7. Parametric Aggregation

Figure 6:
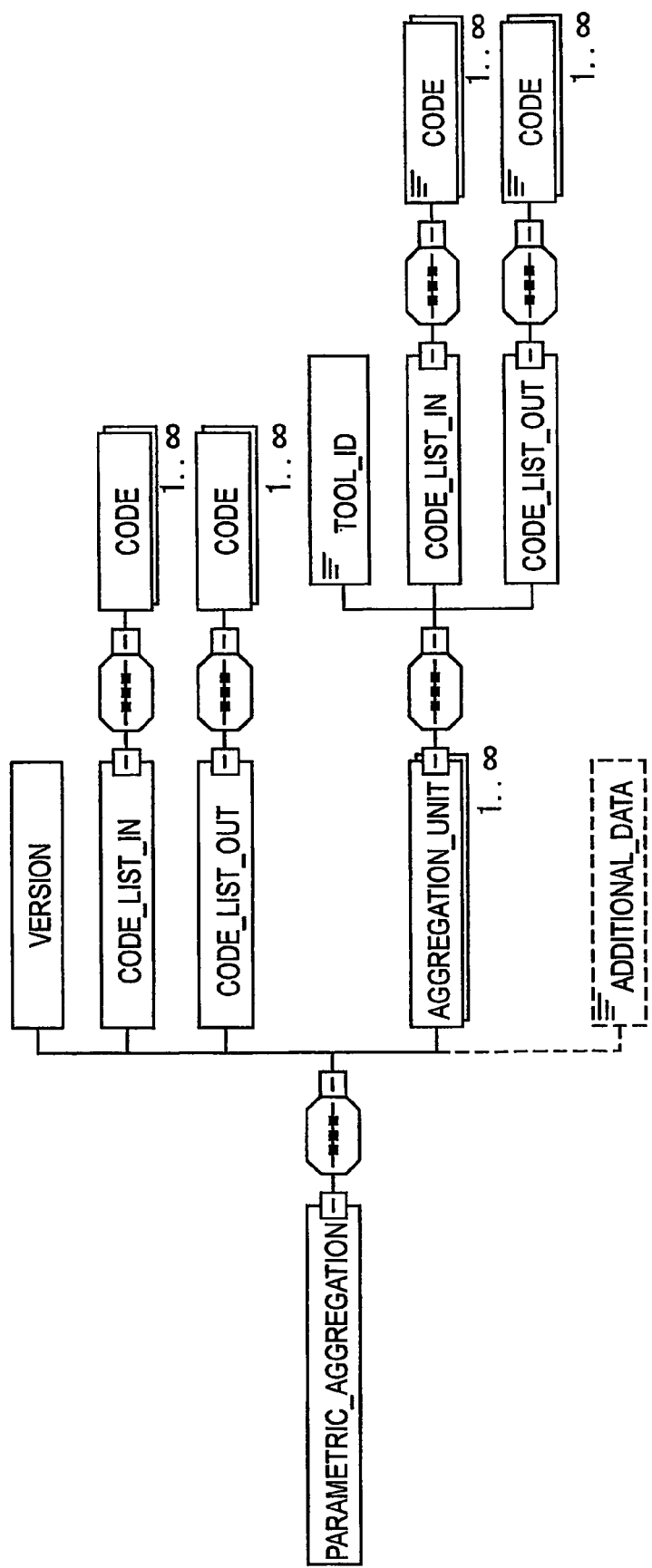
FIG. 6 shows the architecture of Parametric Aggregation.
Figure 7:
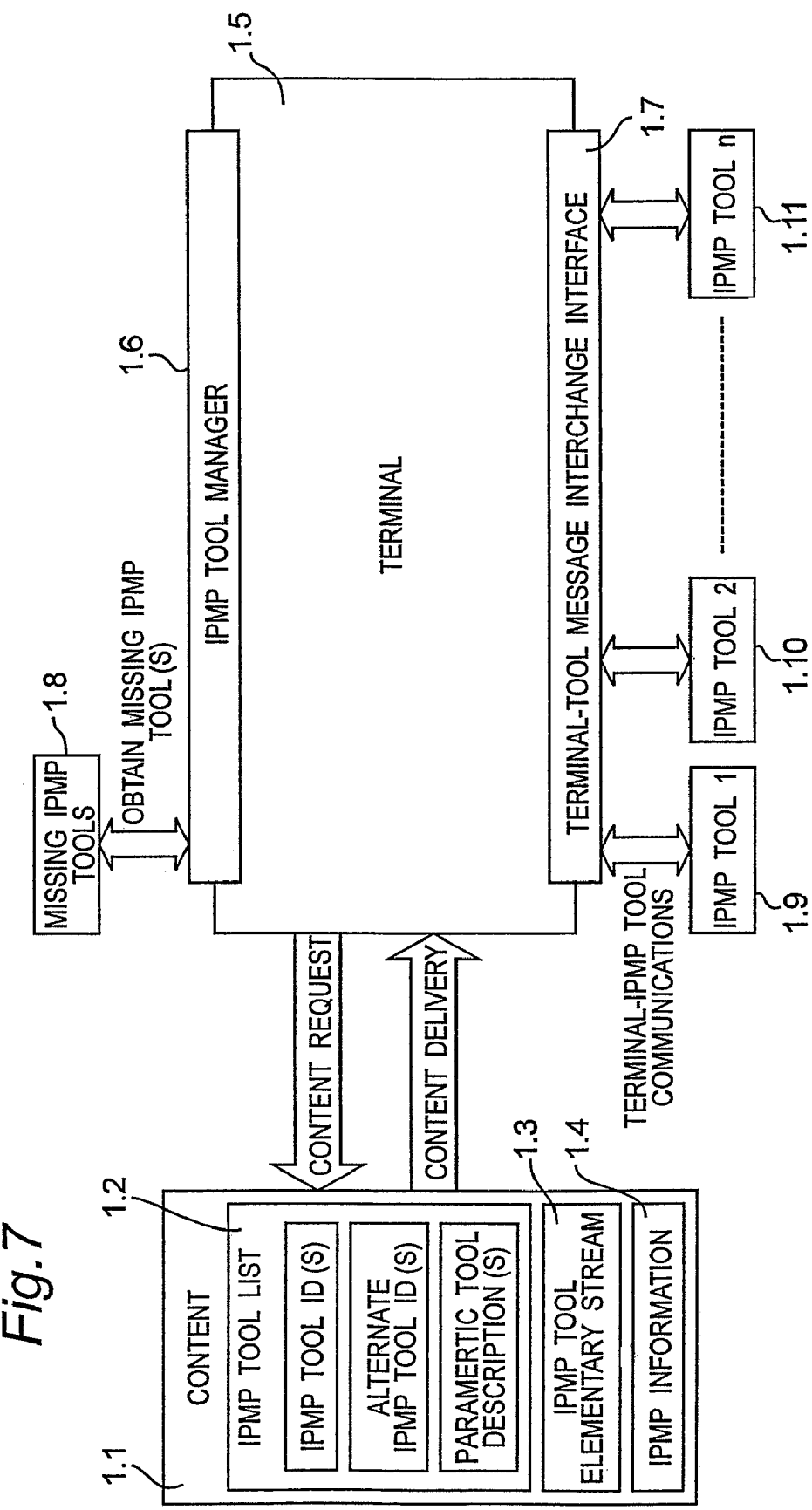
FIG. 7 shows IPMP architecture for generic IPMP as the prior art.

FIG. 6 illustrates the architecture of the parametric aggregation which is described in the following XML schema.

```xml
<?xml version="1.0" encoding="UTF-8"?>
<xsd:schema xmlns:xsd="http://www.w3.org/2001/XMLSchema" elementFormDefault="qualified">
    <xsd:element name="PARAMETRIC_AGGREGATION">
        <xsd:annotation>
            <xsd:documentation>Comment describing your root element</xsd:documentation>
        </xsd:annotation>
        <xsd:complexType>
            <xsd:sequence>
                <xsd:element name="VERSION">
                    <xsd:complexType>
                        <xsd:attribute name="MAJOR_VERSION" type="xsd:string"/>
                        <xsd:attribute name="MINOR_VERSION" type="xsd:string"/>
                    </xsd:complexType>
                </xsd:element>
                <xsd:element name="CODE_LIST_IN">
                    <xsd:complexType>
                        <xsd:sequence>
                            <xsd:element name="Code" maxOccurs="unbounded">
                                <xsd:complexType>
                                    <xsd:simpleContent>
                                        <xsd:extension base="xsd:anySimpleType">
                                            <xsd:attribute name="code" type="xsd:string" use="required"/>
                                            <xsd:attribute name="Interface_ID" type="xsd:integer" use="optional"/>
```

-continued

```
                </xsd:extension>
              </xsd:simpleContent>
            </xsd:complexType>
          </xsd:element>
        </xsd:sequence>
      </xsd:complexType>
    </xsd:element>
    <xsd:element name="CODE_LIST_OUT">
      <xsd:complexType>
        <xsd:sequence>
          <xsd:element name="Code" maxOccurs="unbounded">
            <xsd:complexType>
              <xsd:simpleContent>
                <xsd:extension base="xsd:anySimpleType">
                  <xsd:attribute name="code" type="xsd:string" use="required"/>
                  <xsd:attribute name="Interface_ID" type="xsd:integer" use="optional"/>
                </xsd:extension>
              </xsd:simpleContent>
            </xsd:complexType>
          </xsd:element>
        </xsd:sequence>
      </xsd:complexType>
    </xsd:element>
    <xsd:element name="AGGREGATION_UNIT" maxOccurs="unbounded">
      <xsd:complexType>
        <xsd:sequence>
          <xsd:element name="TOOL_ID" type="xsd:string"/>
          <xsd:element name="CODE_LIST_IN">
            <xsd:complexType>
              <xsd:sequence>
                <xsd:element name="Code" maxOccurs="unbounded">
                  <xsd:complexType>
                    <xsd:simpleContent>
                      <xsd:extension base="xsd:anySimpleType">
                        <xsd:attribute name="code" type="xsd:string" use="required"/>
                        <xsd:attribute name="Interface_ID" type="xsd:integer" use="optional"/>
                      </xsd:extension>
                    </xsd:simpleContent>
                  </xsd:complexType>
                </xsd:element>
              </xsd:sequence>
            </xsd:complexType>
          </xsd:element>
          <xsd:element name="CODE_LIST_OUT">
            <xsd:complexType>
              <xsd:sequence>
                <xsd:element name="Code" maxOccurs="unbounded">
                  <xsd:complexType>
                    <xsd:simpleContent>
                      <xsd:extension base="xsd:anySimpleType">
                        <xsd:attribute name="code" type="xsd:string" use="required"/>
                        <xsd:attribute name="Interface_ID" type="xsd:integer" use="optional"/>
                      </xsd:extension>
                    </xsd:simpleContent>
                  </xsd:complexType>
                </xsd:element>
              </xsd:sequence>
            </xsd:complexType>
          </xsd:element>
        </xsd:sequence>
      </xsd:complexType>
    </xsd:element>
    <xsd:element name="ADDITIONAL_DATA" type="xsd:string" minOccurs="0"/>
  </xsd:sequence>
 </xsd:complexType>
</xsd:element>
</xsd:schema>
```

8. Effect of Invention

This invention solves the following problems by specifying XML schemas for terminal platform specification, parametric description and parametric aggregation.

1. When an IPMP terminal goes to a remote site trying to retrieve a missing IPMP tool in order to playback a certain content, the IPMP terminal can use the terminal platform XML schema to provide the remote site terminal platform specification, so that the remote site can send a tool that can run on this particular IPMP terminal.
2. An IPMP Tool's metadata may optionally include the terminal platform specification using the terminal platform XML schema that specifies what are the terminals and platforms that the tool can run on.
3. A parametric description using the parametric description schema to allow terminal to choose a certain IPMP tool that can facilitate the job it is supposed to do.
4. A parametric aggregation using the parametric aggregation schema to allow several tools to form as one tool set, and appeared as just one tool to the IPMP terminal.

Although the present invention has been described in connection with specified embodiments thereof, many other modifications, corrections and applications are apparent to those skilled in the art. Therefore, the present invention is not limited by the disclosure provided herein but limited only to the scope of the appended claims.

The invention claimed is:

1. A method of transferring information specifying an intellectual property management and protection (IPMP) tool utilized for processing a content protected by IPMP to an IPMP terminal, wherein the method uses extensible markup language (XML) schema for a terminal platform specification in IPMP system, and comprises:
based on a predetermined terminal platform schema and language to describe a terminal platform,
creating the terminal platform specification based on the terminal platform schema and language to specify on what platform or terminal the IPMP tool can run;
attaching the terminal platform specification to metadata associated with the tool; and
transferring the terminal platform specification and the IPMP tool to an IPMP terminal implemented with a terminal platform parser based on the terminal platform schema and language.

2. The method according to claim 1, further comprising, before the transferring, carrying the tool together with the terminal platform specification in the content protected in IPMP.

3. A method of transferring information specifying a tool utilized for processing a content protected by intellectual property management and protection (IPMP) to an IPMP terminal, wherein the method uses extensible markup language (XML) schema for terminal platform specification in an Moving Picture Experts Group (MPEG)-n IPMP system,
based on a predetermined terminal platform schema and language to describe a terminal platform, the terminal platform specification is created at an IPMP terminal according to the terminal platform schema and language to specify the IPMP terminal, and the method comprises:
receiving from the IPMP terminal the terminal platform specification when the IPMP terminal tries to retrieve an IPMP tool from a remote server;
using a terminal platform parser based on the terminal platform schema and language; and
interpreting the terminal platform specification and determining which IPMP tool should be sent back to the requesting IPMP terminal.

* * * * *

UNITED STATES PATENT AND TRADEMARK OFFICE
CERTIFICATE OF CORRECTION

| | | |
|---|---|---|
| PATENT NO. | : 7,610,630 B2 | Page 1 of 1 |
| APPLICATION NO. | : 10/493219 | |
| DATED | : October 27, 2009 | |
| INVENTOR(S) | : Ming Ji et al. | |

It is certified that error appears in the above-identified patent and that said Letters Patent is hereby corrected as shown below:

At item 87 of the printed patent, "Dec. 9, 2003" should be -- Sept. 12, 2003 --.

Signed and Sealed this

Sixteenth Day of February, 2010

David J. Kappos
*Director of the United States Patent and Trademark Office*